United States Patent [19]
Muldoon

[11] Patent Number: 5,421,098
[45] Date of Patent: Jun. 6, 1995

[54] APPARATUS FOR ADJUSTING GOLF CLUB LOFT AND LIE

[76] Inventor: Douglas P. Muldoon, 26321 Wilson, Dearborn Heights, Mich. 48127

[21] Appl. No.: 257,936

[22] Filed: Jun. 10, 1994

Related U.S. Application Data

[63] Continuation of Ser. No. 926,945, Aug. 10, 1992, abandoned.

[51] Int. Cl.⁶ .................................................. G01B 3/00
[52] U.S. Cl. ............................................ 33/508; 33/334; 33/373; 273/163 A
[58] Field of Search ............... 33/508, 370, 371, 372, 33/373, 333, 334, 343, 382; 273/32 R, 32 B, 162 B, 163 A

[56] References Cited

U.S. PATENT DOCUMENTS

| | | | |
|---|---|---|---|
| 2,973,581 | 3/1961 | Rhodehamel | 33/508 |
| 3,292,928 | 12/1966 | Billen . | |
| 3,439,429 | 4/1969 | Sundstrom | 33/508 |
| 4,094,072 | 6/1978 | Erb | 33/508 |
| 4,167,268 | 9/1979 | Lorang . | |
| 4,549,357 | 10/1985 | Hirose . | |
| 4,580,350 | 4/1986 | Fincher . | |
| 4,620,431 | 11/1986 | Muldoon . | |
| 4,622,836 | 11/1986 | Long et al. . | |
| 4,640,017 | 2/1987 | Cukon . | |
| 4,655,457 | 4/1987 | Thompson . | |
| 4,858,332 | 8/1989 | Thomas | 33/508 |
| 4,875,293 | 10/1989 | Wakefield | 33/508 |
| 4,929,397 | 5/1990 | Wang . | |
| 4,934,706 | 6/1990 | Marshall | 33/334 X |
| 4,993,710 | 2/1991 | Marshall . | |
| 5,105,550 | 4/1992 | Shenoha | 33/508 |

*Primary Examiner*—Alvin Wirthlin
*Attorney, Agent, or Firm*—Gifford, Krass, Groh, Sprinkle, Patmore, Anderson & Citkowski

[57] ABSTRACT

An apparatus for adjusting the loft and lie of a golf club head. The invention includes three components. The first is a fitting gauge removably attachable to the shaft for identifying the ideal angles of the loft and lie of the club. The fitting gauge includes a first indicator for measuring the loft angle and a second indicator for measuring the lie angle. The second component of the invention is a bench to which the golf club head is attached. The bench includes a lie reading gauge and a loft reading gauge. The bench may be used for either left-handed golf clubs or for right-handed golf clubs. The third component is an adjusting tool that may be removably attached to the hosel of the club fixed to the bench. The shaft of the club is manipulated relative to the golf club head to adjust the actual lie and loft angles to match the ideal angles of loft and lie by movement of the adjusting tool.

30 Claims, 5 Drawing Sheets

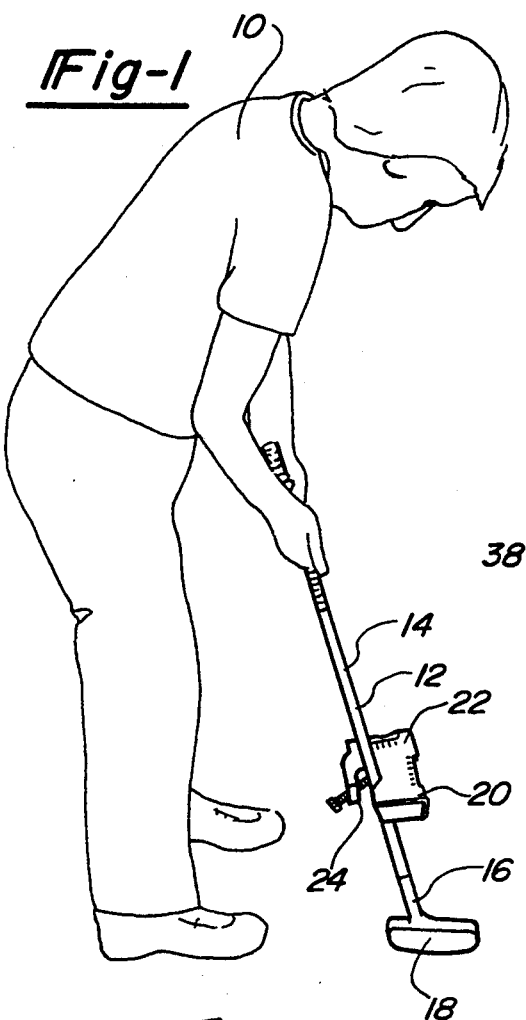
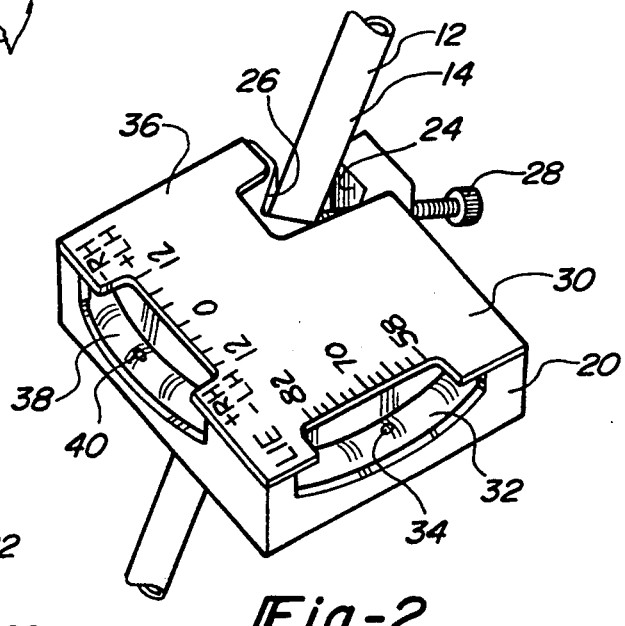
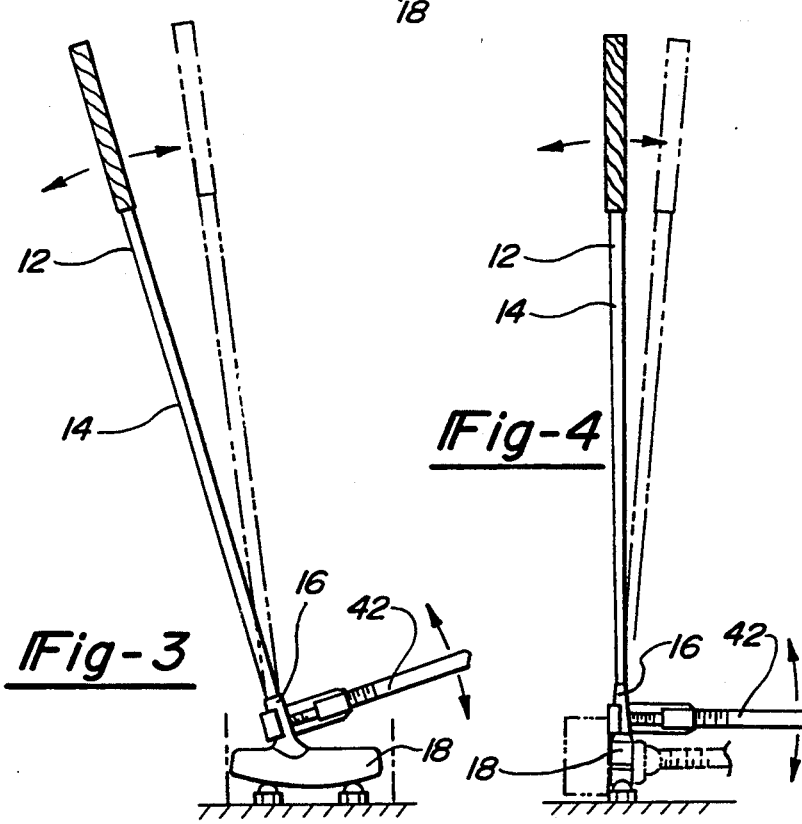
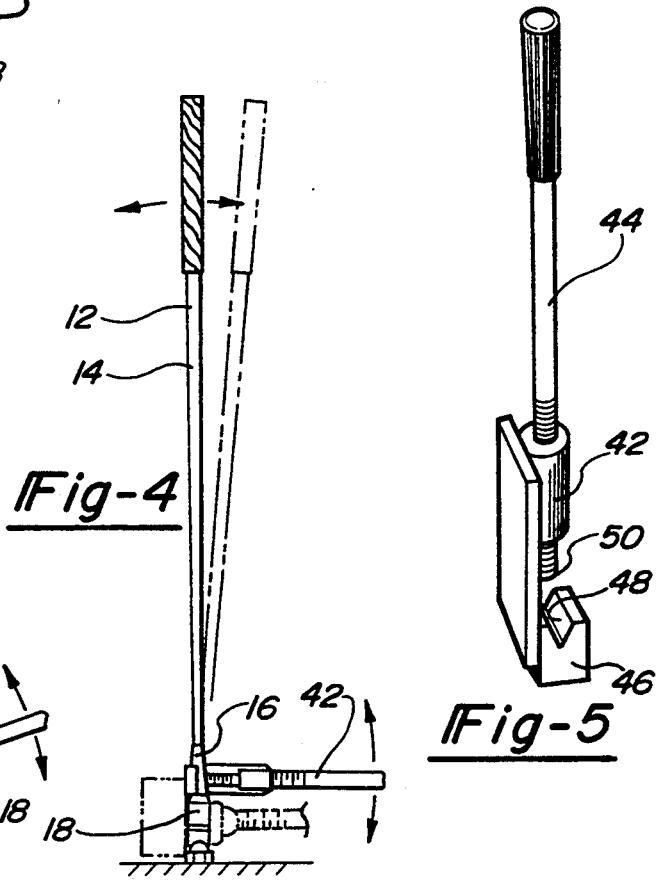
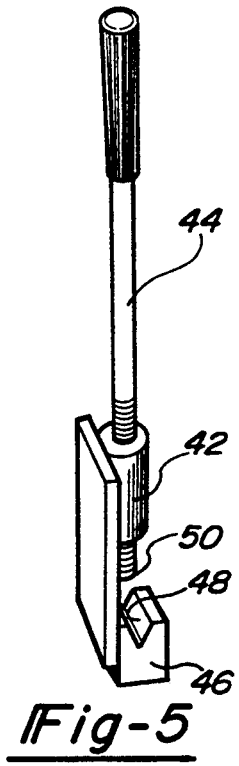

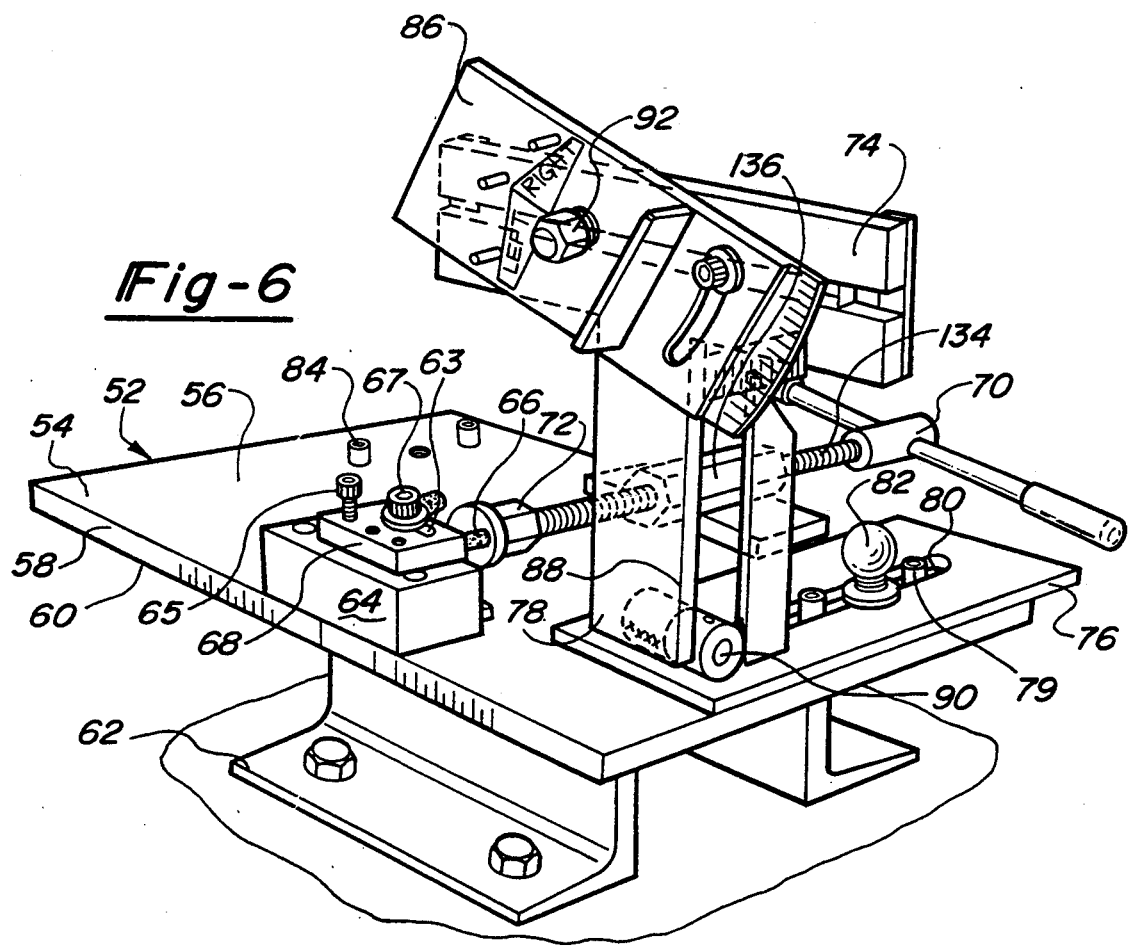
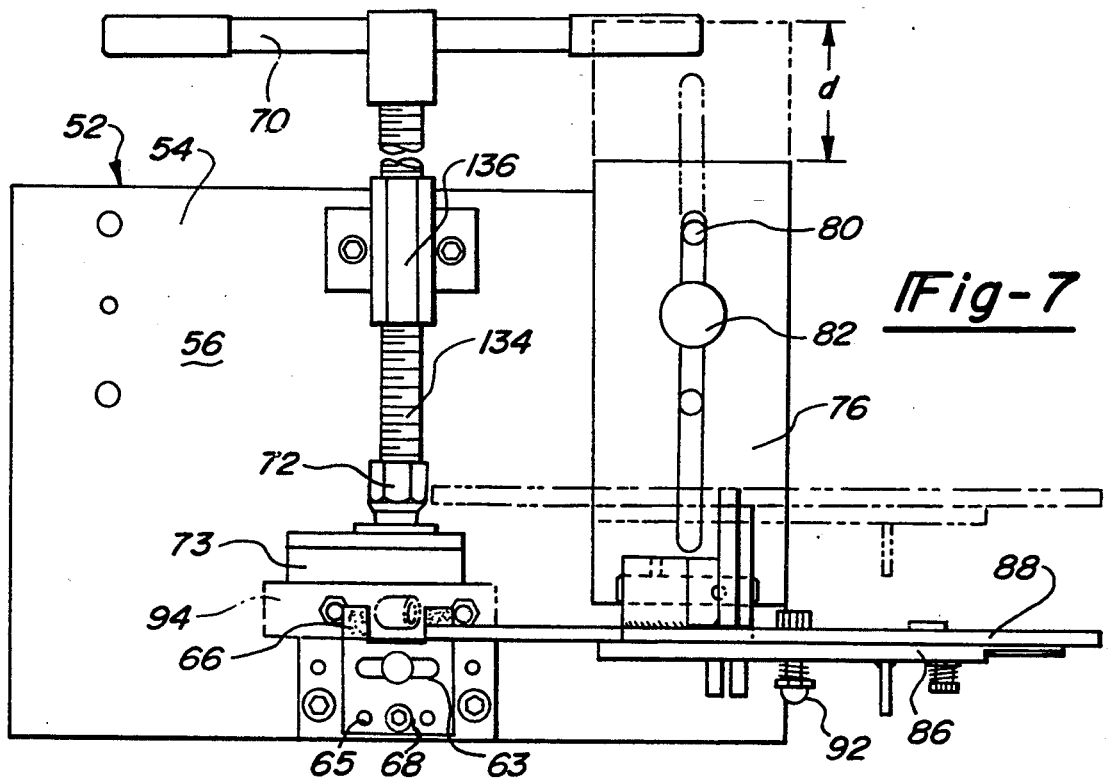

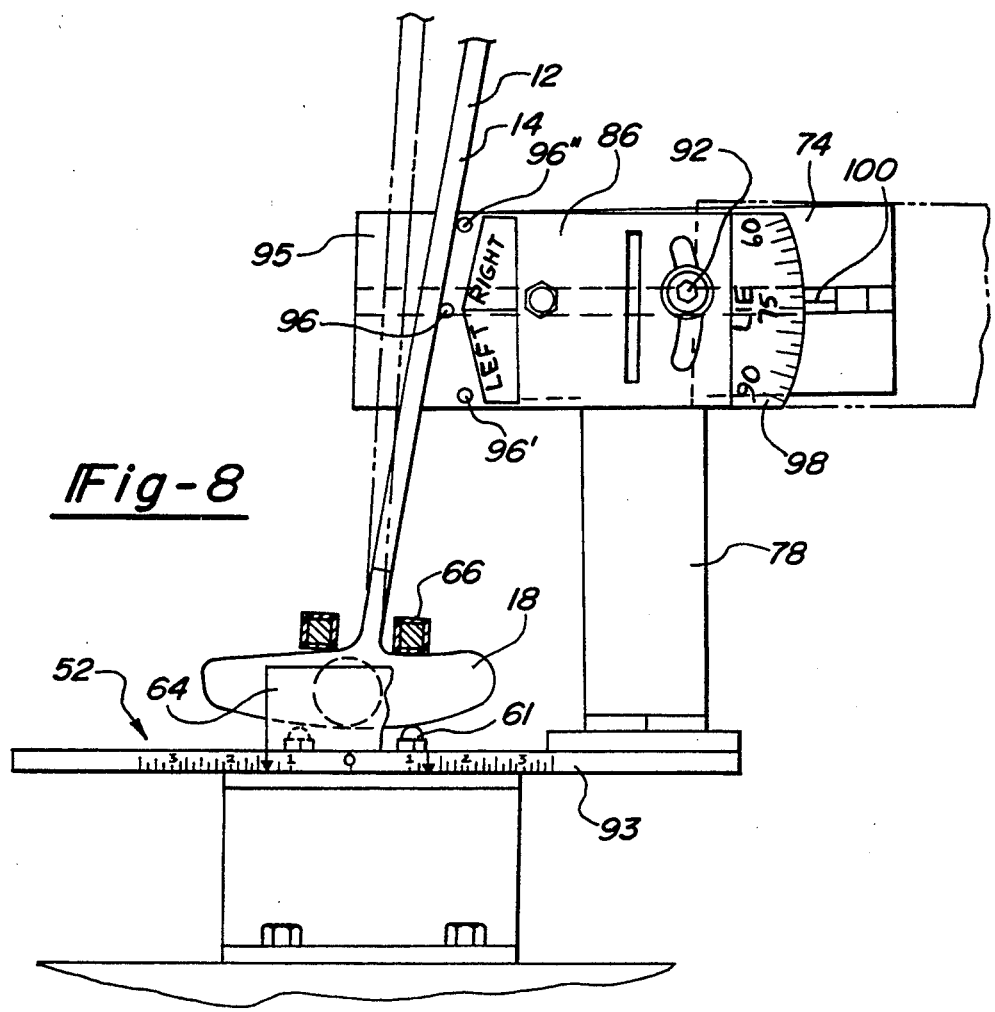

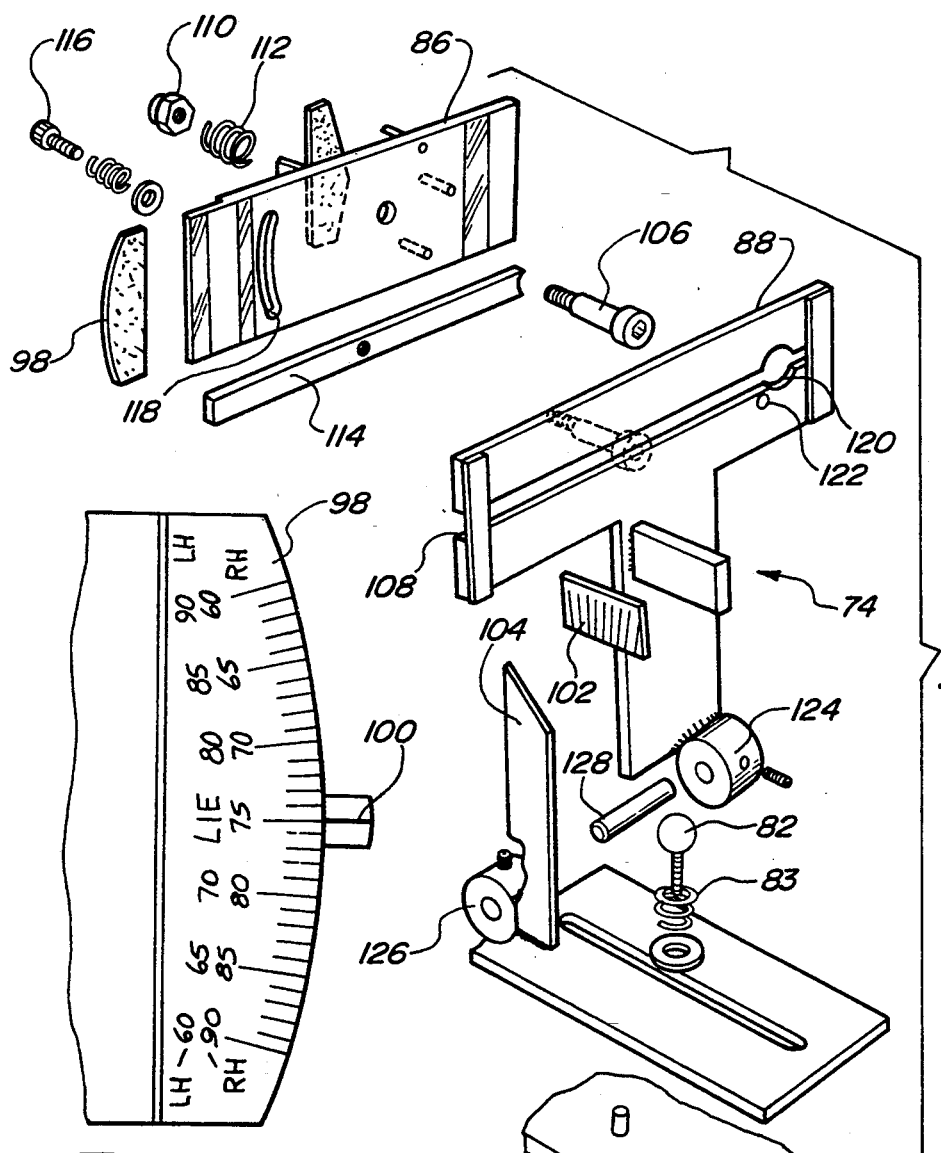
Fig-10
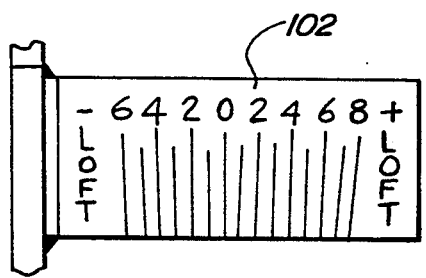
Fig-11
Fig-12
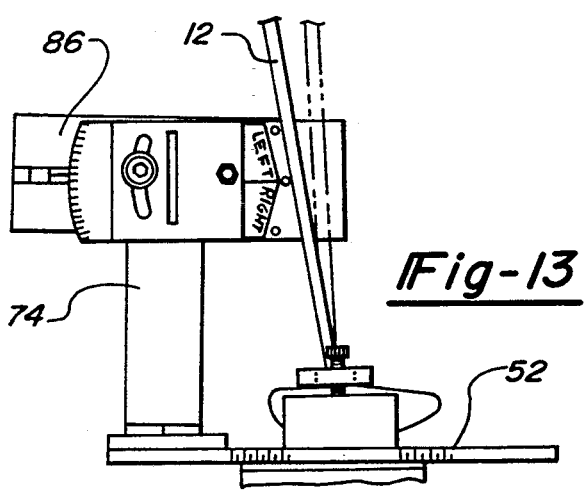
Fig-13

APPARATUS FOR ADJUSTING GOLF CLUB LOFT AND LIE

This is a continuation of application Ser. No. 07/926,945 filed on Aug. 10, 1992 now abandoned.

BACKGROUND OF THE INVENTION

I. Field of the Invention

The present invention relates generally to golf clubs. More particularly, the present invention relates to an apparatus for adjusting the loft and lie of a golf club. The apparatus comprises a fitting gauge for attachment to the shaft of a golf club, a bench to which the golf club is attached for adjustment, and a manipulating tool.

II. Description of the Relevant Art

The game of golf is a very ancient sport which has been perennially popular. The basic tool of this sport, the golf club, has undergone considerable change over the years. As the construction of golf clubs has changed, the golfer is now able to have a golf club that may be personalized to his height and stance.

Of particular importance in "personalizing" the golf club is the adjustment of the angular relationship of the golf club head with respect to the shaft. There are two particular characteristics regarding the relative position of the golf club head to the shaft that must be addressed. The first is the lie angle. This angle is the angle between the center line of the hosel bore and the ground line. This angle is determined at a point tangent to the center line of the base of the golf club head. The lie angle is important because if, for example, the club's sole is angled upward when the club head impacts the ball, the face of the club head will be aimed to the left of the medial line of the fairway. Naturally, the ball will travel in this left-of-center direction because that is the direction in which it is aimed. On the other hand, if the club's sole is angled in a downward direction, the opposite effect will be obtained. Specifically, the face of the golf club head faces to the right and, accordingly, the travel of the ball will go to the right of the medial line of the fairway.

The other angle of the golf club head relative to the shaft is the loft angle. The loft angle is the backward slant of the face of a golf club head. The greater the angle, the greater the loft of the ball after being struck by the club. While the loft of clubs often determines their angle in a conventional way, for example, a "six iron" has a greater loft than a "five iron", these degrees are not absolute. One golfer may use a "six iron" to achieve a certain degree of loft of the ball, whereas another golfer, using the same club, may achieve a different degree of loft. This is because the grip and stance of golfers differs such that upon impact of the club face on the ball, the loft angle may be different from one golfer to the other. Accordingly, this angle too must be personalized to meet the particular habits of the individual golfer.

In the past there have been attempts to provide systems for adjusting golf club heads relative to the shaft of the club. For example, U.S. Pat. No. 4,580,350 issued to Fincher, discloses an attachment that may be fitted to the face of the golf club head. The attachment includes a locator which defines an alignment ridge for insertion into one of the parallel grooves of the golf club face. Observing the level indicated on the attachment while the golf club is in a resting position gives the golfer an idea of the direction that the golf club will direct the ball.

A somewhat more sophisticated combination shaft position indicator attachment is disclosed in U.S. Pat. No. 4,934,706 issued to Marshall. This patent discloses a golf training aid that is attached to the shaft of the golf club and is used to indicate to the golfer visually the relative position of the golf club shaft itself to the ground. The relative position is determined by reading bubble indicators provided on the attachment.

A similar system is provided in U.S. Pat. No. 4,655,457 issued to Thompson. The system includes a golf club specially suited for the purpose of identifying certain head-to-shaft angles and has an adjustable handle and includes a gauge fitted to the approximate hosel of the golf club. The gauge is used to measure the position of the head of the golf club relative to the shaft.

While all of these accessories have some value in fitting a club to the golfer, none overcomes the problem of the lack of a reliable system that provides not only a method of measuring the optimum loft and lie of a golf club for a particular golfer, but also of thereafter allowing the particular club to be adjusted according to the preferred angles of lie and loft to meet the personalized needs of the golfer. Accordingly, prior approaches to adjusting the loft and lie angles to fit the individual needs of the golfer have failed to provide an efficient, convenient and accurate system or apparatus for making these adjustments.

SUMMARY OF THE PRESENT INVENTION

The present invention comprises an apparatus for determining the preferred or "ideal" loft and lie of a golfer's club and for adjusting the club head so that its angles of loft and lie are equivalent to the determined ideal values.

The invention comprises three main components. The first component is a fitting gauge for determining the ideal loft and lie of the golfer's club as it is held in the pre-swing stance by the golfer. The fitting gauge comprises a body having a lie measuring gauge and a loft measuring gauge. The fitting gauge is removably attached to the shaft of the club. The gauge is self-aligning according to a groove defined in a channel that aligns itself with the shaft. Once fitted, the club is held by the golfer in a pre-swing stance and readings are taken from the lie measuring and loft measuring gauges.

The club is then attached to the second component, the adjusting bench. The bottom side of the club head rests upon a pair of spaced apart knobs that act as a cradle. A pair of arms are disposed against the top side of the club head, one arm on each side of the hosel, to provide downward force to brace the club head against the knobs. Thus the club head is properly soled on the knobs.

The adjusting bench further includes a locking bar that presses against the backside of the club head, thereby locking the front side against a stop. Once locked in position, a measuring assembly that is mounted to the top side of the bench is adjusted so that its shaft abutment face abuts the shaft of the club. The measuring assembly may be used for either right- or left-handed clubs simply by removing and reversing it and reattaching it to the other side of the bench. Regardless of whether used for right- or left-handed clubs, the angles of loft and lie are then read along a loft gauge and a lie gauge according to how the shaft rests against the measuring assembly. The bench may be either free standing, attached to a floor or a similar fixed surface, or may be fitted in a vice.

The shaft is then manipulated in relation to the golf club head until the values indicated on the bench (the "actual" values) match those determined from reading the values from the fitting gauge (the "ideal" values). A shaft manipulating tool, the third component, is attached to the hosel of the club. The tool is thereafter used to adjust the shaft of the club by gentle bending.

The apparatus of the present invention is preferably suited for the loft and lie angle adjustment of putters. However, the system could also be used for such similar adjustment of irons and woods because the principle behind loft and lie angle adjustments remains the same regardless of the club from which these measures are made.

The invention accordingly overcomes problems of previous systems and devices by providing the user with a convenient and accurate system both for determining the personalized loft and lie angles of a golfer and then adapting a club head to these ideal angles by use of a bench and tool combination. This system and the construction of its components will be exemplified in the construction set forth hereinafter and the scope of the invention will be set forth in the claims.

DETAILED DESCRIPTION OF THE DRAWINGS

For a fuller understanding of the nature and objects of the invention, reference should be made to the following detailed description, taken in connection with the accompanying drawings, in which:

FIG. 1 is a perspective view of golfer holding a club to which is attached a loft and lie fitting gauge according to the present invention;

FIG. 2 is a perspective view of the fitting gauge;

FIG. 3 is a side view of a golf club mounted to the bench of the present invention with the manipulating tool in place;

FIG. 4 illustrates an end view of the same club of FIG. 3 also showing the manipulating tool in place;

FIG. 5 is a perspective view of the manipulating tool of the present invention;

FIG. 6 is a perspective view of the adjusting bench of the present invention;

FIG. 7 is a plan view of the adjusting bench;

FIG. 8 is a side view of the club in place on the adjusting bench;

FIG. 9 is an end view of the club in place on the adjusting bench;

FIG. 10 is an exploded view of the component parts of the measuring assembly removed from the bench;

FIG. 11 is a close-up view of the lie gauge of the measuring assembly;

FIG. 12 is a close-up view of the loft gauge of the measuring assembly;

FIG. 13 is a side view showing the bench rearranged for measuring a left-handed golf club;

DETAILED DESCRIPTION OF THE PREFERRED EMBODIMENT OF THE PRESENT INVENTION

Figure 14:
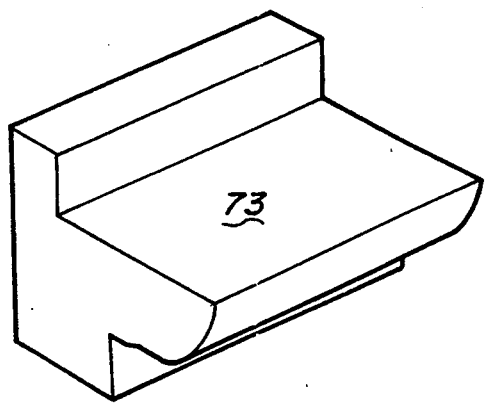
FIG. 14 is a perspective view of the clamping block for holding the golf club head.

The drawings disclose a preferred embodiment of the present invention. While the configuration according to the illustrated embodiment is preferred, it is envisioned that alternate configurations of the present invention may be adopted without deviating from the invention as portrayed. The preferred embodiment is discussed hereafter.

With reference to FIG. 1, a golfer, generally indicated as 10, is shown assuming a pre-swing stance and holding a golf club 12 accordingly. The golf club 12 includes a shaft 14, a hosel 16 and a head 18. A component of the present invention, a loft and lie fitting gauge 20, is illustrated as being fitted to the shaft 14 of the club 12. As illustrated, the fitting gauge 20 includes a top indicator reading side 22. The indicator reading side 22 faces up, or faces the golfer 10.

The stance shown in FIG. 1 is that assumed by the golfer 10 for proper indication of his "ideal" or "personalized" loft angle and lie angle. This is not to be confused with the actual loft and lie angles of the head 18 ultimately achieved after the shaft 14 is manipulated relative to the head 18 according to the present system. Rather, the fitting gauge 20 is used to determine the ideal position of the loft and lie angles of the shaft 12, or to provide a proper "fit" for the club to the particular golfer. The determined angles are thereafter imposed upon the head 18 by use of the bench and manipulating tool discussed below.

Referring to FIG. 2, a close-up perspective view of the fitting gauge 20 is illustrated. The gauge 20 includes a slot 24 that includes a shaft receiving groove 26. A screw 28 is used to press the shaft 14 against the groove 26. Thus applied, the gauge 20 is not likely to shift on or become loosened from the shaft 14.

As may be seen, the top indicator reading side 22 shows a lie scale 30 and an associated arched vial 32. The vial 32 includes a bubble or a float 34. To determine the ideal lie, the placement of the bubble or float 34 is read against the lie scale 30 after the club 12 is held in the pre-swing stance by the golfer. This ideal lie angle reading is marked down.

The top indicator reading side 22 also includes a loft scale 36 and an associated arched vial 38. The vial 38 includes a bubble or a float 40. To determine the ideal loft, the placement of the bubble or float 40 is read against the loft scale 36 after the club 12 is held in the pre-swing stance by the golfer. The reading is taken according to whether or not the golfer is right- or left-handed, as these two possibilities are provided for on the loft scale 36 as may be seen by referring to the drawing. This ideal loft angle reading is also marked down.

Once the preferred or ideal readings are determined, the club is attached to the bench and a manipulating tool is attached to the club. The shaft of the club is then worked against loft and lie scales on the bench until the loft and lie measurements taken by the fitting scale are matched. FIGS. 3 through 5 illustrate the manipulating tool.

Referring first to FIG. 3, a manipulating tool 42 is shown attached to the hosel 16 of the club 12. To adjust the lie of the club the tool is provided parallel to the head 18 as illustrated. The handle end of the tool 42 is shifted in one direction or the other as indicated by the direction arrows to, adjust the lie angle of the club 12.

FIG. 4 also shows the tool 42 attached to the hosel 16. However, in this position, that is, perpendicular to the head 18, the tool 42 is used to adjust the loft angle of the club head 18. Again, the handle end of the tool 42 is shifted in one direction or the other as indicated by the direction arrows to adjust the loft angle of the club 12.

FIG. 5 illustrates the manipulating tool 42. The tool 42 comprises a handle 44 and a body 46 through which the handle may be threadably turned. The body 46 includes a shaft-receiving channel 48 into which is placed the shaft 14. To lock the shaft 14, into the tool 42, the handle 44 is turned so that a holding end 50 of the handle 44 abuts the shaft 14 and locks it into the channel 48. The tool 42 is removed by turning the handle 44 in the opposite direction.

Referring to FIG. 6, a perspective view of the adjusting bench of the present invention, generally indicated as 52, is shown. The bench 52 includes a table 54 having a top side 56, a front side 58 and a bottom side 60. One or more legs 62 are preferably mounted to the bottom side 60 of the bench 52. The legs 62 may be bolted to a floor or workbench, or may be locked in a vice (not shown).

On the top side 56 of the table 54 is fixed a club face stop 64. It is against the stop 64 that the face of the golf club head (not shown) is braced when locked in place. With reference also to FIG. 8, a pair of arms 66 are provided to press down against the top side of the golf club head 18. The arms 66 are provided to rest upon either side of the hosel 16. The arms 66 are fitted to an adjustable plate 68 that may be moved side-to-side by a hold-down bolt 67 provided in an elongated slot 63 to accomodate different styled putters.

An adjustable locking handle 70 is threadably mounted on the top side 56 of the table 54. Mounted to the locking handle 70 is a bar 134 which is threadably moveable through a bar holding collar 136. Mounted to the bar 134 is a club head ram 72 that presses against a clamping block 73 (see FIG. 7) that in turn abuts the back side of the golf club head so as to lock it against the stop 64. The handle 70 is turned down to lock the golf club head 18 in place and is turned out to release the club head.

A measuring assembly 74 is removably mounted to the top side 56 of the table 54. The assembly 74 includes a slidable base subassembly 76 and a pivoting arm subassembly 78 that is pivotably attached to the slidable base subassembly 76.

Attached to the front of the pivoting arm subassembly is a rotating lie measuring bracket 86. The bracket 86 is rotatably attached to an upright brace 88 at fastener 92. The upright brace 88 is pivotably connected to the base subassembly 76 at pivot juncture 90.

The bench 52 of the present invention is adaptable for measurement and adjustment of either right or left-handed golf clubs. As illustrated, the measuring bracket assembly 74 is shown for taking measurements of a right-handed club. The base subassembly 76 includes an elongated slot 80 that accommodates a pair of right hand studs 79. The base subassembly is held to the table 54 by a knob 82. A spring 83 is provided to apply a slight pressure on the subassembly 76. This pressure is just adequate to hold the subassembly 76 against the top side 56 of the table 54 while still allowing sliding motion of the subassembly 76. To use the bench 52 for left-handed clubs, the knob 82 is removed and the base subassembly 76 is moved on top of a pair of left hand studs 84. In addition, when going from right-handed club adjustment to left-handed club adjustment, the lie measuring bracket is removed from the upright brace 88, invented, and is reattached to the brace 88.

FIG. 7 illustrates a top plan view of the bench 52. A portion of the golf club head 18 is shown in broken lines. This view more clearly demonstrates how the club head ram 72 rests upon the clamping block 73, and this combination in turn forces the club head 18 against the stop 64. This figure also more fully illustrates how the slidable base subassembly 76 may be moved toward and away from the club mounted on the bench 52. This slidable adjustment is provided to compensate for the great variety of shapes of shafts of putters and other clubs. As illustrated, the subassembly 76 is slid to its most extreme forward position. The distance "d" (shown in shadow lines) illustrates the subassembly 76 in its most extreme backward position.

FIG. 8 illustrates a side view of the bench 52 as it is used to determine the lie of the golf club.

Before a proper measurement of either the loft or lie angles of the club may be taken, the user must be certain that the center of the club head 18 is mounted equivalent to the center of the club face stop 64. To find the head's center, the golf club head 18 is placed against a ruler 93 provided on the front side 58 of the table 54. The ruler 93 is preferably marked on its face numerically by decreasing, zeroed, then increasing numbers such as "3-2-1-0-1-2-3" with "0" being center. The club head 18 is placed against the ruler so that an equal amount of space is allowed on both sides of "0". The bench user notes, preferably by marking thereon, the center of the club head 18. With the center being identified, the club 12 is then mounted on the stop 64 with the marked center of the head 18 being aligned with the center of the stop 64.

The head 18 is then placed upon a pair of spaced apart knobs 61 that function as a cradle. The knobs 61 provide resting points for the underside of the head 18 regardless of the curvature of the underside. This allows the club head 18 to be properly soled. The arms 66 are then set upon the club head 18 with one arm to each side of the hosel 16. With the arms 66 so positioned, a bolt 65 (see FIGS. 6 and 7) is turned down so that the arms 66 press firmly against the top side of the head 18. (The hold-down bolt 67 is loosely provided through an elongated slot 63 defined in the adjustable plate 68. The bolt 67 accordingly acts as a fulcrum by applying downward movement of the arms 66 when the bolt 65 is tightened.)

Once the club 12 is locked in position against the stop 64, measurement of the loft and lie angles begins. To make these measurements, the slidable and spring loaded base subassembly 76 is slid toward the shaft 14 of the club 12 until its forward-most edge is roughly behind the axis of the club head 18. Thereafter, the uprighted brace 88 is pivoted toward the shaft 14 until a shaft abutment region 95 of the lie measuring bracket 86 rests directly against the shaft 14.

A set of three alignment pins 96, 96', 96" are used to properly align the shaft 14 with respect to the lie measuring bracket 86. The central pin 96 is always the lower of the two pins used for alignment regardless of the handedness of the clubs being measured. As illustrated, measurement of the lie of a right-handed club utilizes the pair of pins 96, 96" for alignment. When used for left-handed clubs, the measuring bracket 86 is turned upside down, so the pair of pins 96, 96' are instead used.

Once the rotatable lie measuring bracket 86 is rotated until the pins 96, 96" rest against the shaft 14, the lie angle is then measured by reading the position of the lie gauge 98 as it appears against a fixed mark 100. This value is the actual lie angle. If this value is found not to correspond with the ideal value as first determined from the fitting gauge 20, the manipulating tool 42 is used to gently adjust the alignment of the shaft 14 with respect to the head 18. The pins 96, 96" are again aligned and the actual lie angle is again read. This process is repeated until the actual lie angle matches the ideal lie angle.

FIG. 9 illustrates an end view of the bench 52 with a club 12 in place and more fully shows how the bench 52 is used for measuring the loft angle. As may be seen, the slidable base subassembly 76 is positioned just behind the golf club head 94. The upright brace 88 is pivoted forward until the shaft abutment region 95 of the rotatable lie measuring bracket 86 rests against the shaft 14 as done with respect to the taking of the lie angle measurement.

Once the shaft 14 is flush with the shaft abutment region, the loft angle measurement may be taken. On the backside of the upright brace 88 there is provided a loft gauge 102. A pointer 104 is fixed to the top side of the slidable base subassembly 76 and is positioned so that the pointer 104 and the loft gauge 102 intersect. The value determined from the intersection of the pointer and gauge is the actual loft angle. If this value is found not to correspond with the ideal value as first determined from the fitting gauge 20, the manipulating tool 42 is used to gently adjust the alignment of the shaft 14 with respect to the head 18. The loft angle is again read. If the ideal loft angle is not achieved, the process is repeated until the actual loft angle matches the ideal loft angle.

During this procedure particular care must be taken to verify that the shaft abutment region 95 lies flush with the shaft 14. If this is not the case, the position of the slidable base subassembly will accordingly need to be altered until there is flush contact.

Referring to FIG. 10, an exploded view of the measuring asssembly 74 is illustrated. The elements discussed above are shown as individual components in this illustration.

To allow the bracket 86 to slide freely back and forth along the brace 88, a slidable bar 114 is bolted to the back of the bracket 86. The bar slides freely back and forth within a channel 108 defined in the upright brace 88. A screw 116 holds the bracket 86 to the bar 114. The shank of the screw 116 passes through an arcuate slot 118 defined in the bracket 86.

The bracket 86 pivots on the brace 88 so as to allow proper alignment of the pins 96, 96" (or 96, 96', as the case may be) with the shaft 14. However, to switch from measuring one of a left- or right-handed club to another and back again, it is necessary that the bracket 86 be removed from the upright brace 88, inverted, and returned to the brace 88. To accomplish this measure in the most convenient manner, a shoulder bolt 106 is provided both as the pivot point and to allow for removal and reattachment of the bracket 86.

The shank of the bolt 106 rides in a channel 108 provided in the brace 88. The shouldered underside of the head of the bolt 106 rides along the side of the brace 88 opposite the measuring bracket 86. In addition to the exploded solid illustration of the bolt 106 shown in FIG. 10, the bolt 106 is also shown in shadow lines positioned in the channel 108.

The threaded portion of the bolt 106 passes through the bracket 86 and is threaded into a nut 110. A spring 112 is provided between the nut 110 and the bracket 86 to place a continuous tension on the bolt 106. Tension is adequate to prevent the bracket 86 from becoming loosened from the brace 88.

To remove the bracket 86 from the brace 88, the user moves the bracket toward a bolt head passing aperture 120 defined in the brace 88 at an end of the channel 108. The user then presses upon the nut 110 and thereby compresses the spring 112. This action moves the bolt head away from the backside of the brace 88, thereby allowing the head to pass over a raised bolt stop 122. Once past the stop 122, the bolt head is passed through the aperture 120, and the bracket 86 is removed. Reattachment is opposite the detachment steps.

FIG. 10 also details the pivot juncture 90 by illustrating a bracket knuckle 124 and a brace knuckle 126. A pivot pin 128 connects the two knuckles 124, 126.

FIG. 11 shows a close-up view of the lie gauge 98 that is fitted to the bracket 86. As noted above with respect to FIG. 8, the value found by reference to this gauge is the actual lie angle value of the club 12. The gauge 98 is marked with values for both right- and left-handed clubs, and the particular value used depends on the handedness of the club. The fixed mark 100 for measuring is fixed to the slidable bar 114.

FIG. 12 shows a close-up view of the loft gauge 102 fitted to the backside of the brace 88. As noted above with respect to FIG. 9, the value found by reference to this gauge is the actual loft angle value of the club 12. The gauge 102 is marked with a single set of values, as the handedness of the club 12 has no affect on the loft angle.

FIG. 13 substantially illustrates a miniature view of FIG. 8, but instead the measuring assembly 74 is attached to the opposite side of the table 54 so that the bench 52 can be used to measure and subsequently align left-handed clubs.

Referring to FIG. 14, the clamping block 73 shown from a top view in FIG. 7 is illustrated in perspective view. The clamping block 73 is preferably composed of nylon or similar polymerized material, thereby preventing marring of the club head as well as providing a block that will allow adaptation to the slight variations between the backsides of club heads.

Figure 15:
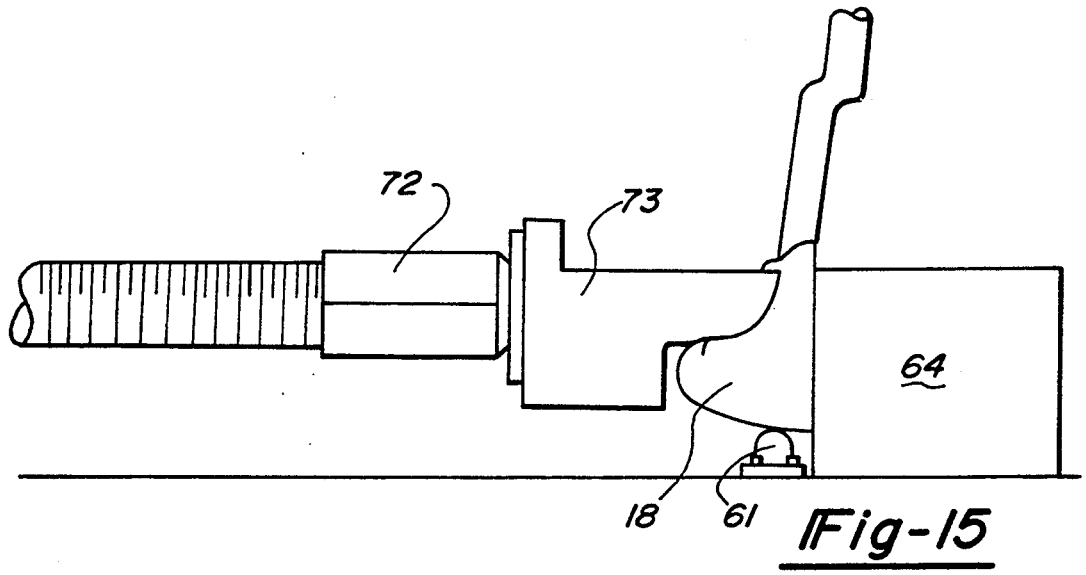
FIG. 15 is a side view illustrating the clamping block in place between the club head ram and a golf club head.

FIG. 15 illustrates a side view showing the clamping block 73 in position between the back side of a golf club head 18 and the club head ram 72. The close tolerance between the back side of the golf club head 18 and the clamping block 73 may easily be seen. The clamping block 73 includes a number of surfaces that may be rested against the back side of the club head 18 depending upon the contour that must be matched.

Figure 16:
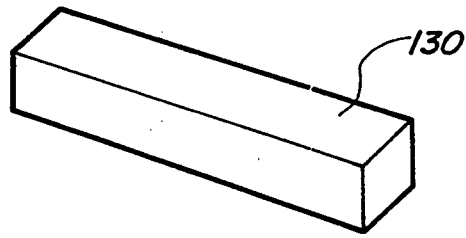
FIG. 16 is a perspective view of an alternate clamping block.
Figure 17:
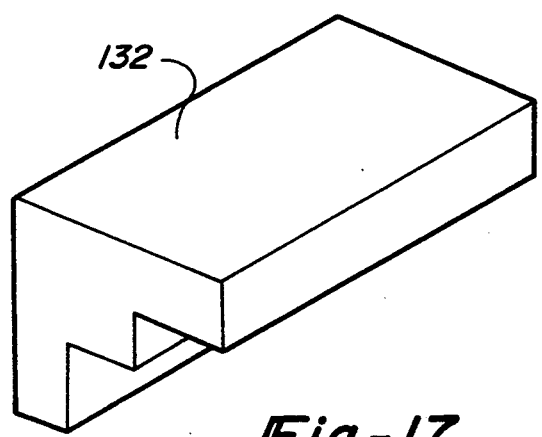
FIG. 17 is a perspective view of yet another alternate clamping block.

FIG. 16 illustrates an alternate clamping block 130 that may be used against the back side of the golf club head having an alternate shape (not shown). Similarly, FIG. 17 illustrates yet another alternate clamping block 132. Like the block 73, the clamping block 132 includes a variety of sides of different shapes that may be used in cooperation with the back sides of a considerable variety of golf club heads.

Having described my invention, however, many modifications thereto will become apparent to those skilled in the art to which it pertains without deviation from the spirit of the inveniton as defined by the scope of the appended claims.

I claim:

1. A device for determining the lie and loft of angles of a golf club, said device comprising:
   a base;
   a bracket means for measuring the loft and lie angles of a golf club attached to said base;
   means for locking a golf club to said base;
   a first gauge assembly attached to said bracket means for measuring the lie of said golf club;
   a second gauge assembly attached to said bracket means for measuring the loft of said golf club;
   means for removably attaching said bracket means to said base;
   said base including a first bracket means receiving region for attachment of said bracket means for measuring the loft and lie of a right-handed club; and
   said base including a second bracket means receiving region for attachment of said bracket means for measuring the loft and lie of a left-handed club.

2. The device of claim 1 wherein said first gauge assembly is pivotably attached to said bracket.

3. The device of claim 1, wherein said means for locking comprises a club face stop mounted to said base, an adjustable locking handle removably attached to said base, a bar mounted to said handle, and a bar holding collar, said bar holding collar being attached to said base, said bar being selectively removable through said collar to press and hold the head of said golf club against said club face stop.

4. The device of claim 3 wherein said bar is threaded into said bar holding collar.

5. The device for adjusting of claim 1 wherein said base further includes a leg for mounting said device to a fixed surface.

6. The device of claim 1, wherein said means for locking a golf club to said base includes means for locking a purer to said base.

7. A device for determining the lie and loft angles of a golf club, said device comprising:
   a base;
   means for locking a golf club to said base;
   a first gauge assembly attached to said base for measuring the lie of said golf club;
   a second gauge assembly attached to said base for measuring the loft of said golf club;
   said base further including a bracket, said first gauge assembly being pivotably attached to said bracket;
   said bracket including a front side and said first gauge assembly comprising a shaft abutment plate, said abutment plate being pivotably mounted to said front side of said bracket.

8. The device of claim 7 wherein said front side of said bracket further includes a lie measuring gauge against which the pivotable movement of said abutment plate is measured when said shaft abuts said abutment plate.

9. A device for determining the lie and loft angles of a golf club, said device comprising;
   a base;
   means for locking a golf club to said base;
   a first gauge assembly attached to said base for measuring the lie of said golf club;
   a second gauge assembly attached to said base for measuring the loft of said golf club;
   said base further including a bracket, said bracket being pivotably mounted to said base, said second gauge assembly having a first measuring portion mounted to said bracket and a second measuring portion mounted to said base.

10. The device of claim 9 wherein said bracket is removably attached to said base, whereby said bracket may be moved from a first position for measuring the loft and lie of a left-handed club to a second position for measuring the loft and lie of a right-handed club.

11. The device of claim 9 wherein said bracket includes a shaft abutment face whereby that the measurement of loft may be taken by reading said second gauge assembly when said abutment face of said bracket is pivotably adjusted to rest against the shaft of said club.

12. The device of claim 9 wherein said second measuring portion comprises a pointer and said first measuring portion comprises a loft measuring gauge against which the degree of loft is determined according to the position of said pointer when said abutment face abuts said shaft of said golf club.

13. A device for determining the lie and loft angles of a golf club, said device comprising:
   a base;
   means for locking a golf club to said base;
   a first gauge assembly attached to said base for measuring the lie of said golf club;
   a second gauge assembly attached to said base for measuring the loft of said golf club;
   said means for locking comprising a club face stop mounted to said base, an adjustable locking handle removably attached to said base, a bar mounted to said handle, and a bar holding collar attached to said base, said base being selectively movable through said collar to press and hold the head of said golf club against said face stop;
   said bar being threaded into said bar holding collar;
   said means for locking further including a hosel holding collar attached to said face stop gripping the hosel of said golf club.

14. A device for determining the lie and loft angles of a golf club, said device comprising:
   a base;
   means for locking a golf club to said base;
   a first gauge assembly attached to said base for measuring the lie of said golf club;
   a second gauge assembly attached to said base for measuring the loft of said golf club;
   said device further including a golf club head centering and alignment gauge against which the head of said golf club is placed to determine its center and by which said golf club head is aligned when locked to said device.

15. A system for adjusting the lie and loft of a golf club, said system comprising in combination:
   a golf club:
   a bench, said bench having mounted thereon means for locking said golf club to said bench, said bench further having mounted thereto means for measuring the actual loft and lie angles of said golf club, said means for measuring comprising a bracket, said bracket being removably mounted to said bench;
   a fitting gauge that is removably attached to the shaft of said golf club for measuring the ideal loft and lie angles of said golf club when a golfer holds said club in a pre-swing stance, said fitting gauge including means for measuring the lie and loft of said golf club; and a tool capable of grasping the shaft of said golf club for manipulating the alignment of said shaft with respect to the head of said club so that the actual alignment of said shaft is equivalent to the ideal loft and lie angles determined by reading said fitting gauge.

16. The system for adjusting of claim 15 wherein said fitting gauge includes a body and said means for measuring the lie and loft of said golf club comprises a lie measurement gauge and a loft measurement gauge mounted on said body.

17. The system for adjusting of claim 16 wherein said fitting gauge further includes means for releasably attaching said body to said shaft of said club.

18. The system for adjusting of claim 15 wherein said tool includes a lockable end that receives said shaft and locks said shaft therein.

19. The system for adjusting of claim 18 wherein said lockable end of said tool comprises a grooved shaft receiving part having a groove defined therein and a threadable rod threadably mounted in said shaft receiving part whereby when said rod is turned down said golf club shaft is locked into said groove.

20. The system for adjusting of claim 15 wherein the golf club being locked to said bench is a putter.

21. A method for adjusting the lie and loft of a golf club, said method including the steps of:

attaching a lie and loft angle fitting gauge to the shaft of a golf club;

maintaining the club in a pre-swing position;

reading the fitting gauge to determine the ideal lie and loft angles;

attaching the head of said club to a device for adjusting the lie and loft of a golf club; and adjusting said club by bending so that the actual degrees of lie and loft of said club equal the ideal degrees of lie and loft identified on said fitting gauge when said club was maintained in said pre-swing position.

22. The method of adjusting the lie and loft of a golf club according to claim 21, wherein said step of attaching said head of said club to said device comprises attaching said head of said club to a golf club head holding brace provided on said device, said brace having a midpoint, said method further including the step of finding the center point of the head of said golf club prior to attaching the head of said club to said device and aligning this center point with said midpoint of said golf club head holding brace provided on said device.

23. The method of adjusting the lie and loft of a golf club according to claim 22 wherein said step of finding the center of said club comprises the step of placing the head of said golf club against a centering gauge provided on said device.

24. The method of adjusting the lie and loft of a golf club according to claim 21, said method further including the step of attaching a bending bar to said club prior to bending said club.

25. The method of adjusting the lie and loft of a golf club according to claim 21 wherein the golf club being adjusted is a putter.

26. A device for determining the lie and loft angles of a golf club, said device comprising:
a base;

a bracket means for measuring the loft and lie of a golf club attached to said base;

wherein the shaft of said golf club rests against said bracket means;

said bracket means comprising a lower member and an upright member, said lower member being attached to said base and said upright member being pivotably attached to said lower member and, wherein said lower member is slidably attached to said base.

27. A device for determining the lie and loft angles of a golf club, said device comprising:
a base;

a bracket means for measuring the loft and lie of a golf club attached to said base;

wherein the shaft of said golf club rests against said bracket means;

said bracket means including a bracket sliding assembly and said base including a base sliding assembly, said sliding assemblies being interattached whereby said bracket means is slidably movable on said base.

28. A device for determining the lie and loft angles of a golf club, said device comprising:
a base;

a bracket means for measuring the loft and lie of a golf club, said bracket means being movably attached to said base;

wherein the shaft of said golf club rests against said bracket means;

a lie measuring assembly;

said lie measuring assembly being pivotably attached to said bracket means.

29. A device for determining the lie and loft angles of a golf club, said device comprising:
a base;

a bracket means for measuring the loft and lie of a golf club, said bracket means being movably attached to said base;

wherein the shaft of said golf club rests against said bracket means;

a lie measuring assembly;

said lie measuring assembly being slidably attached to said bracket means, said lie measuring assembly having a right-handed club measuring portion and a left-handed club measuring portion, said lie measuring assembly being removable from said bracket means and being reversible from a right-handed club measuring position to left-handed club measuring position.

30. A device for determining the lie and loft of angles of a golf club, said device comprising:
a base;

a bracket means for measuring the loft and lie of a golf club attached to said base;

means for locking a golf club to said base;

a first gauge assembly attached to said bracket means for measuring the lie of said golf club;

a second gauge assembly attached to said base for measuring the loft of said golf club;

means tier removably attaching said bracket means to said base;

said base including a first bracket means receiving region for attachment of said bracket means for measuring the loft and lie of a right-handed club; and said base including a second bracket means receiving region for attachment of said bracket means for measuring the loft and lie of a left-handed club.

* * * * *